April 23, 1957  G. E. KAUFMAN  2,789,799
FOOD MIXERS

Filed March 2, 1954  2 Sheets-Sheet 1

United States Patent Office 2,789,799
Patented Apr. 23, 1957

2,789,799

FOOD MIXERS

George E. Kaufman, Canton, Ohio, assignor to The Hoover Company, North Canton, Ohio, a corporation of Ohio Application March 2, 1954, Serial No. 413,533

1 Claim. (Cl. 259—134)

The present invention relates to food mixers or blenders and more particularly to a flexible blender element or spinner for use with a drink mixer in which the spinner is easily flexed as it is inserted into the material being mixed and thereafter expands to its normal mixing position under the influence of centrifugal force.

Other objects and advantages of the present invention will become apparent as the description proceeds when taken in connection with the accompanying drawings in which.

Figure 3:
Fig. 3 is a sectional view of the blender element per se.

The flexible blender or spinner element of the present invention is shown in Fig. 3 and is represented by the numeral 10. It is originally blanked in a circular disc formation from a flexible fabric, preferably a fairly heavy nylon or polyethylene fabric which is unaffected by the materials being mixed. The disc 10 is formed with a central opening 11 for attachment to the shaft 12 of a portable power unit generally indicated by the reference numeral 13.

The blender or spinner element 10 is blanked from a heavy sheet of nylon or polyethylene fabric of appreciable thickness and thereafter shaped to a U-shaped formation as shown in Fig. 3 by the application of heat and pressure. The disc 10 may also be formed in a sort of undulated or wavy formation if desired.

The blender or spinner element 10 thus formed is attached to the end of the shaft 12 by any suitable means, such as by a screw 14.

The power unit 13 and the receptacle 15 is disclosed in a co-pending application by Werner G. Seck, Serial No. 374,900, filed August 18, 1953.

The mixer receptacle 15 is preferably made of any suitable material such as a ceramic or plastic and may be transparent or not as desired. It is formed with a socketed handle 16 having a socket 17 for receiving the reduced end 18 of a handle 19 for the power unit 13.

The power unit 13 includes a casing 20 for housing the motor and gearing for driving the mixer shaft 12 at a very high speed in a manner well known in the art, the shaft 12 being preferably directly connected to the motor rotor. The motor may be controlled by a manually actuable switch 21.

The material to be mixed is designated by the reference numeral 22 and may be a heavy semi-solid material such as ice cream or a mixture of ice and other material to be mixed.

Operation

Figure 1:
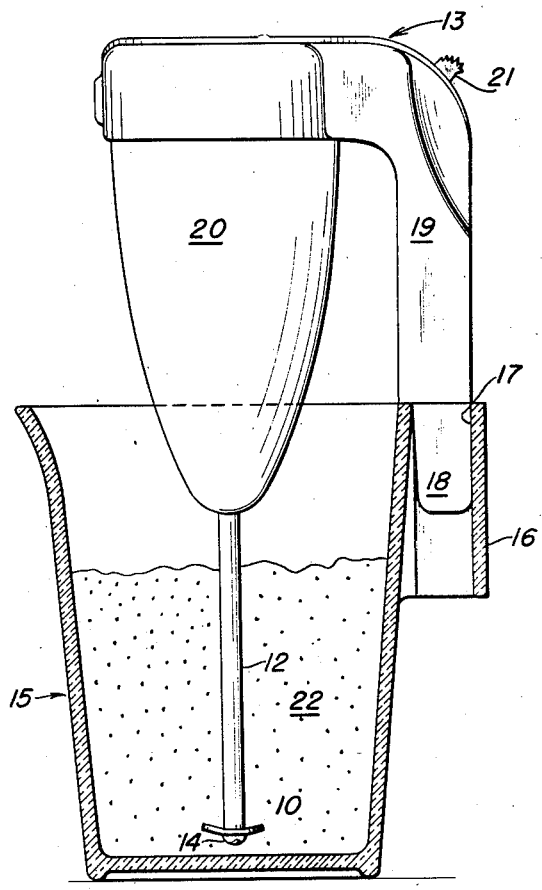
Fig. 1 is a view partly in section showing the parts of the blender of the present invention in their position of use.

The material 22, which may be a semi-solid material or a mixture of solids with liquids, is placed in the receptacle 15 and the power unit 13 placed in operative position as shown in Fig. 1 with the stem 18 of handle 19 engaging within the socket 17 of the handle 16 of receptacle 15.

Figure 2:
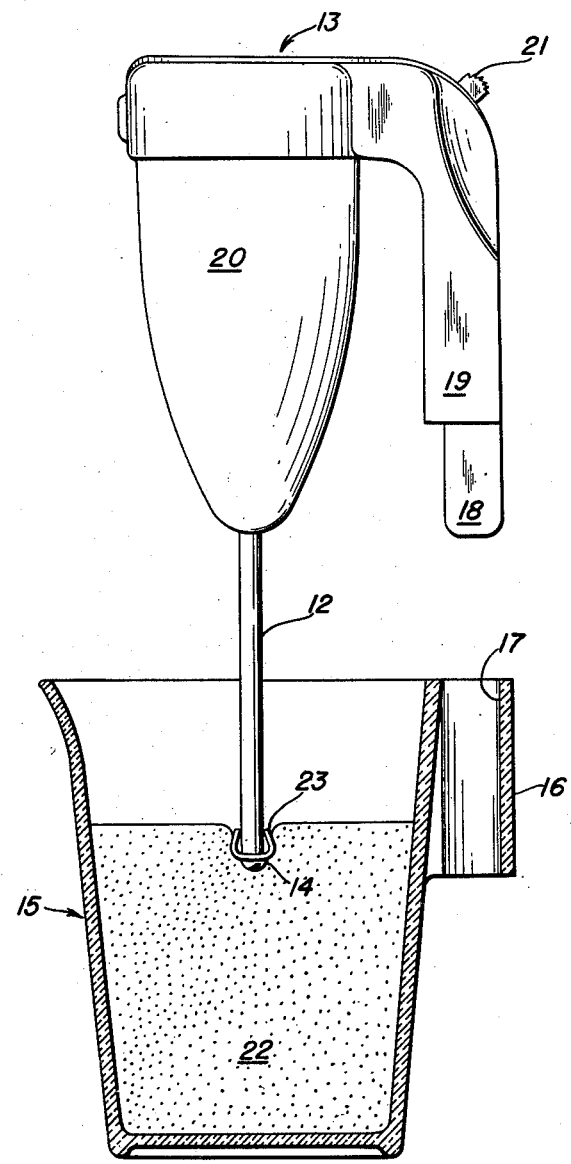
Fig. 2 is a view of the blender of the present invention partly in section showing how the flexible blender element is flexed as it is inserted into the material being mixed.

As the power unit 13 is placed in operative position, the switch 21 may be operated to energize the power unit 13. The resistance of the material 22 to the insertion of the blender blade 10 into the material 22 will cause the side edges 23 of the blender element 10 to fold upwardly as shown in Fig. 2, whereby the blender element 10 and mixer shaft 12 are easily inserted into the material 22.

After the power unit 13 is moved to the position shown in Fig. 1, centrifugal action will cause the sides 23 of the spinner 10 to move outwardly to the position shown and the wavy formation of the spinner or blender element 10 will cause the material 22 to be thoroughly mixed.

It is obvious that the power unit 13 and blender 10 may be used independently of the receptacle 15 and may be carried about to blend any materials in any sort of receptacle, such as a cocktail glass, etc.

From the foregoing it can be seen that the present invention provides a flexible blender element or spinner which is easily insertable into a semi-solid material to be mixed or blended and which will be expanded to its mixing or blending position under the influence of centrifugal action.

While I have shown and described but a single embodiment of my invention, it is to be understood that this embodiment is to be taken as illustrative only and not in a limiting sense. I do not wish to be limited to the particular structure shown and described but to include all equivalent variations except as limited by the scope of the claim.

I claim:

In a portable mixer a rotatable blender or spinner element for insertion into semi-solid materials consisting of a circular disc blanked from a comparatively heavy nylon fabric secured centrally to a high speed mixer shaft, said disc being preformed so as to have an undulated periphery.

References Cited in the file of this patent

UNITED STATES PATENTS

| | | |
|---|---|---|
| 64,928 | Williams | May 21, 1867 |
| 1,466,397 | Graydon | Aug. 28, 1923 |
| 1,836,523 | Beach | Dec. 15, 1931 |
| 2,172,593 | Prince et al. | Sept. 12, 1939 |
| 2,254,236 | Myers | Sept. 2, 1941 |
| 2,286,913 | Kelly et al. | June 16, 1942 |
| 2,471,876 | Kuhn | May 31, 1949 |